E. BOOTZ.

AUTOMOBILE STARTER.

APPLICATION FILED NOV. 18, 1916.

Reissued May 8, 1917.

14,297.

2 SHEETS—SHEET 1.

Inventor

Eugene Bootz

By Mason Fenwick & Lawrence,

Attorneys

E. BOOTZ.

AUTOMOBILE STARTER.

APPLICATION FILED NOV. 18, 1916.

Reissued May 8, 1917.

14,297.

2 SHEETS—SHEET 2.

Inventor

Eugene Bootz

By Mason Fenwick & Lawrence,

Attorneys

THE NORRIS PETERS CO. PHOTO-LITHO. WASHINGTON, D. C.

UNITED STATES PATENT OFFICE.

EUGENE BOOTZ, OF EDGEWATER, COLORADO.

AUTOMOBILE-STARTER.

14,297. Specification of Reissued Letters Patent. Reissued May 8, 1917.

Original No. 1,196,650, dated August 29, 1916, Serial No. 92,540, filed April 20, 1916. Application for reissue filed November 18, 1916. Serial No. 132,201.

*To all whom it may concern:*

Be it known that I, EUGENE BOOTZ, a citizen of the United States, residing at Edgewater, in the county of Jefferson and State of Colorado, have invented certain new and useful Improvements in Automobile-Starters; and I do hereby declare the following to be a full, clear, and exact description of the invention, such as will enable others skilled in the art to which it appertains to make and use the same.

This invention relates to starters for internal combustion engines, and more especially to those which are operated mechanically; and the object of the same is to produce a starter of this kind including a rope to be drawn upon by the driver, and normally disengaged clutch elements which are automatically thrown into engagement by tension on the rope. This and other objects are carried out by the construction hereinafter more fully described and claimed, and as shown in the drawings wherein:—

Figure 5:
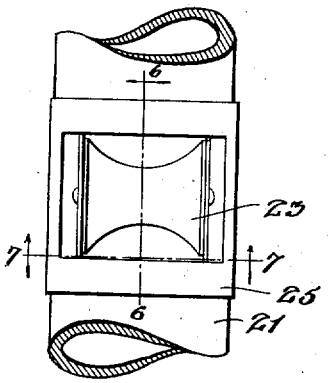
Figure 7:
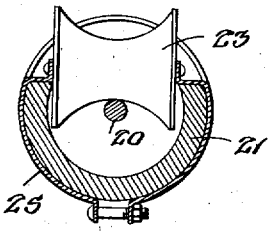
Figure 6:
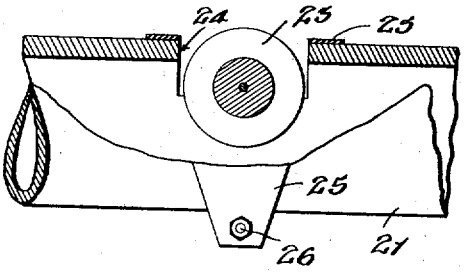

Fig. 5 is a plan view showing one of the anti-friction wheels let into the pipe, and Figs. 6 and 7 are sections on the lines 6—6 and 7—7 respectively of Fig. 5.

My improved starter is of that type wherein a clutch element is applied to the main shaft, and a second clutch element is applied to a drum or pulley loosely mounted on the main shaft, and a rope or cable leads from this pulley to within reach of the operator or driver so that when pulled upon it throws the clutch elements into engagement and rotates the main shaft for starting the engine. Means are provided for keeping the clutch elements normally and constantly out of engagement with each other excepting when the device is in use, and the especial feature of the present invention is that these means are overcome by tension on the rope or cord. The following specification sets forth my preferred manner of carrying out the invention.

Secured to the main shaft 1 by means of a pin 2 or otherwise is a clutch element 3 having teeth 4 on its forward end and a projection or spindle 5, the latter carrying a flanged collar 6 at its forward extremity, held in place by any suitable means such as a cotter pin 7. On this spindle is located a sleeve 15 which serves as the hub of a drum or pulley 11 and of a second clutch element 13 having teeth 14 opposed to those numbered 4, and the combined length of the sleeve 15 and element 13 is less than the distance between the element 3 and the collar 6. The periphery of the pulley may be flat but is preferably dished as shown, and it has a wide rear flange 12. The sleeve, pulley, and clutch element 13 may all be made integral, but this is a matter of design.

Figure 2:
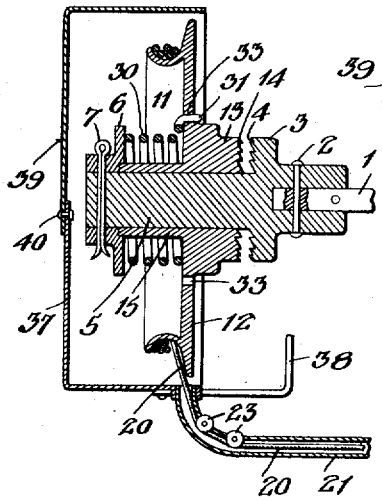
Fig. 2 is an enlarged vertical section through the starter itself.
Figure 3:
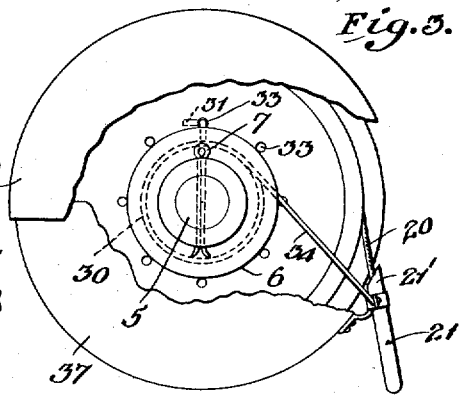
Fig. 3 is a front elevation thereof with part of the casing broken away.

For revolving the pulley and the driving clutch element 13, a rope, cord, chain, or other flexible element 20 is secured to the rim of the pulley and passed several times around it, and is led then downward, through a tube 21 which passes under the engine and hood of the automobile, and upward to a ring 22 which lies on the floor at the driver's feet; and obviously a pull on this rope will give one or more rotations to the pulley 11 and therefore to the driving element 13. In order to reduce friction, at every point where the tube 21 makes a bend one or more anti-friction pulleys 23 are inserted as best seen on sheet 2 of the drawings. For this purpose the tube is cut out at its upper side, or the inside of any bend, as at 24, a strap 25 is passed around the tube and drawn tightly at the lower side thereof as at 26, and the upper ends of this strap form bearings for the shaft of the pulley 23. Instead of a hempen rope 20, a wire rope might be employed and in that case perhaps the anti-friction pulleys would not be necessary. But it is essential to the successful operation of this invention that the forward end of the tube as indicated at 21′ shall rise tangentially toward the rim of the pulley 11 as seen in Fig. 3, and obliquely toward the plane of said pulley as seen in Fig. 2. It therefore follows that the first impulse on the rope 20 causes the latter to bear against the wide rear flange 12 as shown in Fig. 2, and slides the pulley with its sleeve 15 and element 13 to the rear. This engages the teeth 14 with the teeth 4, and rotation of the pulley and the driving element 13 then causes the rotation of the shaft 1. Thus one pull on the rope does the work without the necessity of any other mechanism to engage the clutch elements.

Figure 1:
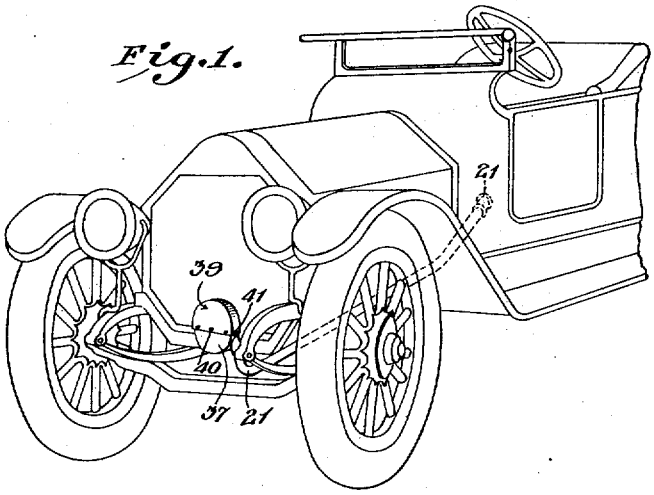
Figure 1 is a perspective view of the front part of an automobile with this improved starter applied.
Figure 4:
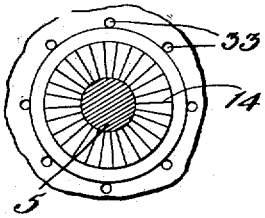
Fig. 4 is a rear elevation of the central portion of the starter.

When the parts are at rest as seen in Fig. 2, the clutch elements are out of engagement. This I preferably bring about by coiling a spring 30 around the sleeve 15, attaching one end 31 to the pulley 11 as by passing it through any of the holes 33 seen in Fig. 4, and bringing its other end 34 downward, preferably through a clamp 35 on the front end 21′ of the tube 21, and finally attaching it at 36 to some rigid member. This member may well be the lower portion 37 of a housing or casing which incloses the entire starter, and is carried by a bracket 38 secured to the frame of the automobile. The upper portion of this casing or housing 39 may well be pivoted at 40 to the lower portion, so that this upper portion can be turned aside to give access to the interior. The housing is drum-shaped as shown in Figs. 1 and 2, and incloses the working parts excepting perhaps the clutch elements, although it could be carried far enough to the rear to inclose these. Any suitable catch as shown at 41 in Fig. 1, may be employed to hold the parts of the housing or casing together. The spring 30 should be quite light, and thus the oblique pull on the rope 20 overcomes this spring and slides the moving parts to the rear to engage the clutch elements. After the engine has been started and draft on the rope is relaxed, the spring restores the parts to their original position by disengaging the clutch elements and drawing on the rope so that the ring or handle 22 falls back to its place on the floor beneath the operator's feet. The use of several convolutions in such spring 30 is highly desirable. The pulley may be of such size that a single pull on the rope gives it more than one complete revolution, and the convolutions or coils of the spring should be sufficient to permit this. In case the engine should "backfire" there should be sufficient spring to permit one or two revolutions without breaking the starter. In case the engine starts on the first revolution, the teeth on the clutch element 3 will "run away" from those on the clutch element 13, and if the spring 30 is light it will yield to permit this. Finally, the spring should be quite flexible because it resists pull on the rope 20, and to make it strong would be to throw greater load onto the operator. The parts are by preference entirely of metal, and exact details are unimportant.

What I claim is:—

1. In an engine starter, the combination with a main shaft having a clutch element, a second clutch element opposed thereto, and yielding means for holding these elements out of engagement; of a pulley connected with said second element, a guide tube leading from the floor of the automobile beneath its engine and with its forward end directed upward tangentially toward the pulley and obliquely across the rim thereof, an anti-friction pulley within said tube and at its bend, and a rope leading from said floor along the tube and over the anti-friction pulley, upward to and around the rim of said driving pulley, and attached to the latter.

2. In an engine starter, the combination with a main shaft having a clutch element, a second clutch element opposed thereto, and yielding means for holding these elements out of engagement; of a pulley connected with said second element and having a wide rear flange, a guide tube led from a distant point with its forward end directed tangentially toward the periphery of said pulley and obliquely to its plane and across said wide flange, and a flexible operating member passing through said tube and wound around the rim of the pulley and attached thereto.

3. In an engine starter, the combination with a main shaft having a clutch element, a second clutch element opposed thereto, and yielding means for holding these elements out of engagement; of a pulley connected with said second element and having a wide rear flange, a guide tube leading from the floor of the automobile beneath its engine and with its forward end directed upward tangentially toward the pulley and obliquely across the rim thereof, anti-friction pulleys within the length of said tube and at its bends, and a rope leading from said floor along the tube and over the anti-friction pulleys, upward to and around the rim of said driving pulley, and attached to the latter.

4. In an engine starter, the combination with a main shaft, a clutch element attached thereto, a second clutch element slidably mounted on said shaft, and a flanged pulley on this element; of a guide tube with its front end directed toward said pulley and obliquely across its wide flange, an operating rope passing through said tube and wound around and secured to the rim of the pulley, and a spring attached at one end to the pulley and having its other end attached to said tube, for the purpose set forth.

5. In an engine starter, the combination with a main shaft, a toothed clutch element attached thereto and having a spindle projecting forward therefrom, a collar fixed on the front end of the spindle, a second toothed clutch element having a sleeve slidably mounted on said spindle between the first element and collar, and a pulley carried by this element and having a wide rear flange; of a guide tube led from the automobile floor beneath its engine and with its front end directed toward said pulley and obliquely across its wide flange, an operating rope passing through said tube and wound around and secured to the rim of the pulley, and a weak spring attached at one end to the pulley, making several convolutions around said sleeve, and having its other end attached to said tube, for the purpose set forth.

6. In an engine starter, the combination with a main shaft, a toothed clutch element attached thereto and having a spindle projecting forward therefrom, a collar fixed on the front end of the spindle, a second toothed clutch element having a sleeve slidably mounted on said spindle between the first element and collar, and a pulley carried by this element and having a wide rear flange; of a guide tube led from the automobile floor beneath its engine and with its front end directed toward said pulley and obliquely across its wide flange, an operating rope passing through said tube and wound around and secured to the rim of the pulley, a casing carried by the automobile frame and inclosing said pulley, the front end of the tube passing upward through the bottom of said casing, and a weak spring having one end attached to the pulley, then coiled around said sleeve between the pulley and collar, and its other end passing through the casing, attached to said tube, and attached to the casing, for the purpose set forth.

7. In an engine starter, a shaft, a clutch element carried on the shaft, a second clutch element slidable upon the shaft, means to hold the clutch elements yieldingly out of engagement, a drum carried by the sliding clutch element having a flange extending beyond the periphery of the drum, a rope wound about the drum and drawing across the flange at an angle to the axis and initially operative directly thereon to pull the drum along the shaft and subsequently to turn said clutch.

8. In an engine starter, the combination with a shaft having a clutch element thereon, a second clutch element slidable upon the shaft into engagement with the first clutch element, yielding means for holding the elements out of engagement, a pulley carried by the sliding clutch element having a wide flange, and an operating rope wound about the pulley and drawing angularly across the flange in the direction toward the clutch element carried by the shaft, the reaction of said rope axially on the flange operating to shift the pulley to close the clutch members and then rotate them.

9. In a starting device for engines, a shaft with a fixed clutch member, a complementary clutch member slidable along the shaft to operatively couple therewith, means normally holding the sliding member disengaged from the other, and a rope connected to the sliding clutch member and operative directly thereon to first pull the member along the shaft to effect clutch engagement.

10. In a starting device for engines, a shaft with a fixed clutch member, a complementary clutch member slidable along the shaft to operatively couple therewith, means normally holding the sliding member disengaged from the other, and a rope connected at one end to said sliding member and so disposed relative thereto that the rope acts directly, when drawn taut, on the said member to shift it axially to close the clutches and subsequent pulling then turns the shaft.

11. In a starting device for engines, a shaft with a fixed clutch member, a complementary clutch member slidable along the shaft to operatively couple therewith, means normally holding the sliding member disengaged from the other, and a draft rope connected to the sliding member and leading therefrom angularly in the direction of pull, whereby when the rope is drawn taut it acts first and directly upon said member to move it in the direction of pull to close the clutch.

In testimony whereof I affix my signature.

EUGENE BOOTZ.

Copies of this patent may be obtained for five cents each, by addressing the "Commissioner of Patents, Washington, D. C."